(12) United States Patent
Takahashi et al.

(10) Patent No.: US 7,457,907 B2
(45) Date of Patent: Nov. 25, 2008

(54) METHOD AND CIRCUIT FOR INTERFACING CARD MEMORY, ASIC EMBEDDED WITH THE INTERFACE CIRCUIT, AND IMAGE FORMING APPARATUS EQUIPPED WITH THE ASIC

(75) Inventors: Toshio Takahashi, Tokyo (JP); Takumi Komori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 227 days.

(21) Appl. No.: 10/640,043

(22) Filed: Aug. 14, 2003

(65) Prior Publication Data
US 2004/0107327 A1 Jun. 3, 2004

(30) Foreign Application Priority Data
Aug. 14, 2002 (JP) ............................. 2002-236586
May 8, 2003 (JP) ............................. 2003-130575

(51) Int. Cl.
*G06F 3/06* (2006.01)
(52) U.S. Cl. .............................. 711/103; 713/1; 710/10
(58) Field of Classification Search ................. 711/103; 713/1; 710/10
See application file for complete search history.

(56) References Cited
U.S. PATENT DOCUMENTS

| 5,671,368 A | * | 9/1997 | Chan et al. | .................. 710/301 |
| 6,859,856 B2 | * | 2/2005 | Piau et al. | .................. 711/103 |
| 2001/0006902 A1 | * | 7/2001 | Ito | ............................ 455/558 |
| 2002/0065044 A1 | * | 5/2002 | Ito | ............................ 455/41 |
| 2003/0229746 A1 | * | 12/2003 | Liu et al. | .................... 710/301 |

FOREIGN PATENT DOCUMENTS

| JP | 10-161857 | 6/1998 |
| JP | 11-242596 | 9/1999 |
| JP | 2002-091709 | 3/2002 |

OTHER PUBLICATIONS

Secure Digital Input/Output (SDIO) Card Specification, Oct. 2001, SD Association, Simplified Version of Part E1, Version 1.00.*

* cited by examiner

*Primary Examiner*—Kevin Ellis
*Assistant Examiner*—Jared I Rutz
(74) *Attorney, Agent, or Firm*—Oblon, Spivak, McClelland, Maier & Neustadt, P.C.

(57) ABSTRACT

An SD card interface, which is an interface for a detachable SD card requiring an access in sector units (a specific size), has a function to initialize an SD controller, a function to initialize an SD card, and a function to acquire status of the SD card.

14 Claims, 13 Drawing Sheets

METHOD AND CIRCUIT FOR INTERFACING CARD MEMORY, ASIC EMBEDDED WITH THE INTERFACE CIRCUIT, AND IMAGE FORMING APPARATUS EQUIPPED WITH THE ASIC

BACKGROUND OF THE INVENTION

1) Field of the Invention

The present invention relates to an interface circuit for a detachable card memory that requires an access in a specific size, an ASIC (application specific integrated circuit) embedded with the interface circuit, and an image forming apparatus equipped with the ASIC.

2) Description of the Related Art

When reinstalling a software for an image forming apparatus like a printer, a copier, or an MFP (multifunction peripheral), the software is downloaded from a host interface like a memory card, a network, etc. However, when carrying out maintenance or update of software as a field support of the image forming apparatus, sometimes it is not possible to use user's system environment and a host interface cannot be used. Therefore, lots of image forming apparatuses are equipped with a memory card interface to reliably download the software.

Since an access to a memory card can be made in a similar way as an access to a RAM (random access memory), there is no need to initialize an interface by a CPU (central processing unit) and it is also possible to execute a program directly from the memory card. Technologies related to the memory card are described in, for example, Japanese Patent Application Laid Open Publication No. 10-161857 and Japanese Patent Application Laid Open Publication No. 11-242596. However, memory cards generally have low storage capacity of about 4 mega bytes and nowadays it becomes hard to come by. For this reason, an SD (secure digital) card is drawing attention as a substitute for the memory card.

The SD card (SD memory card) is being more popular as a portable media like a floppy disc and is already being used for recording and playing of image data and audio data because of its higher storage capacity as a size of the card.

Unlike the RAM, the SD card includes an MBR (master boot record), a partition table, an FAT (file allocation table), and a data area similarly as in a disc media and is a detachable card memory that requires an access in a specific size.

However, in an SD card interface, unlike a memory card interface, there is a need to initialize an interface controller and the SD card. Moreover, in the SD card, since an offset of a data reading out position varies according to the capacity, when a system uses the SD card, it is required that card information is read through an interface circuit and CPU computes and stores an offset value.

Since an access to the SD card is allowed in sector units, even when CPU reads out data of one byte, it has to read out data of 512 bytes equal to the size of one sector. Therefore, when the CPU executes a program stored in the SD card, it is necessary to read the whole program in sector units, copy the program into a RAM and execute the in the RAM. As a result, the SD card cannot be used unless a program for control called a BIOS (basic input output system) is invoked.

Moreover, when there is a communication error between the SD card and the interface circuit, it is required that the CPU varies communication speed and tries the communication again.

However, in recent years, various types of SD cards have been developed, and among them, an SDIO card (card type I/O) having an I/O function is drawing attention. The SDIO card is a card memory embedded with I/O functions like a Bluetooth, a LAN (wireless local area network), and a GPS (global positioning system).

An interface of the SDIO card is equivalent to that of the SD memory card in order to maintain a compatibility with the SD memory card. However, an initialization procedure for the SDIO card is different from that for the SD memory card. Therefore, when an interface circuit can only recognize a command protocol of the SD memory card and cannot recognize a command protocol of the SDIO card, if SDIO card is inserted, a fault is developed in an initializing unit of the interface circuit that may cause a problem of the whole system. Furthermore, since the SDIO card has the same interface as that in the SD memory card, inserting the SDIO card by mistake while carrying out maintenance or software update as a field support of the image forming apparatus causes a fault in the system.

In recent years, scale of a software is increasing together with the increased scale of image forming apparatuses. This necessitates higher storage capacity of memory that stores the software. For this reason, large size software cannot be installed into an image forming apparatus through the SD memory card.

SUMMARY OF THE INVENTION

It is an object of the present invention to solve at least the problems in the conventional technology.

The interface circuit for a detachable card memory according to one aspect of the present invention, which requires an access in a specific size, includes a first initializing unit that initializes an interface controller that reads data from and writes data to the card memory, a second initializing unit that initializes the card memory, and a status acquiring unit that acquires status of the card memory.

The application specific integrated circuit according to another aspect of the present invention, which has an image input/output function, an image processing function, and a plurality of application functions, with a configuration that each of the application functions uses a common memory, includes an interface circuit for a detachable card memory, which requires an access in a specific size, including a first initializing unit that initializes an interface controller that reads data from and writes data to the card memory, a second initializing unit that initializes the card memory, and a status acquiring unit that acquires status of the card memory.

The image forming apparatus according to still another aspect of the present invention is equipped with an application specific integrated circuit having an image input/output function, an image processing function, and a plurality of application functions, with a configuration that each of the application functions uses a common memory, wherein the application specific integrated circuit comprises an interface circuit for a detachable card memory, which requires an access in a specific size, including a first initializing unit that initializes an interface controller that reads data from and writes data to the card memory, a second initializing unit that initializes the card memory, and a status acquiring unit that acquires status of the card memory, and the image forming apparatus has a configuration to download a computer program that is stored in the card memory.

The method of interfacing a detachable card memory according to still another aspect of the present invention, which requires an access in a specific size, includes initializing an interface controller that reads data from and writes data to the card memory, initializing the card memory, and acquiring a status of the card memory.

The other objects, features and advantages of the present invention are specifically set forth in or will become apparent from the following detailed descriptions of the invention when read in conjunction with the accompanying drawings.

DETAILED DESCRIPTION

Exemplary embodiments of the interface circuit for a card memory, an ASIC embedded with the interface circuit circuit, and an image forming apparatus equipped with the ASIC of the present invention are explained with reference to the accompanying drawings. In the specification of the present invention, a term SD card (an example of a card memory) is used for an SD memory card (an example of a memory card not having I/O function) and an SDIO card (an example of a memory card having I/O function).

An image forming apparatus according to a first embodiment of the present invention is explained in details in the order of a configuration of an image forming apparatus, a configuration of the SD card, an initialization of the SD card, a read access to the SD card, and a varying of communication speed of the SD card. Following is an explanation of an SD card as an example of a detachable card memory that requires an access in a specific size.

Figure 1:
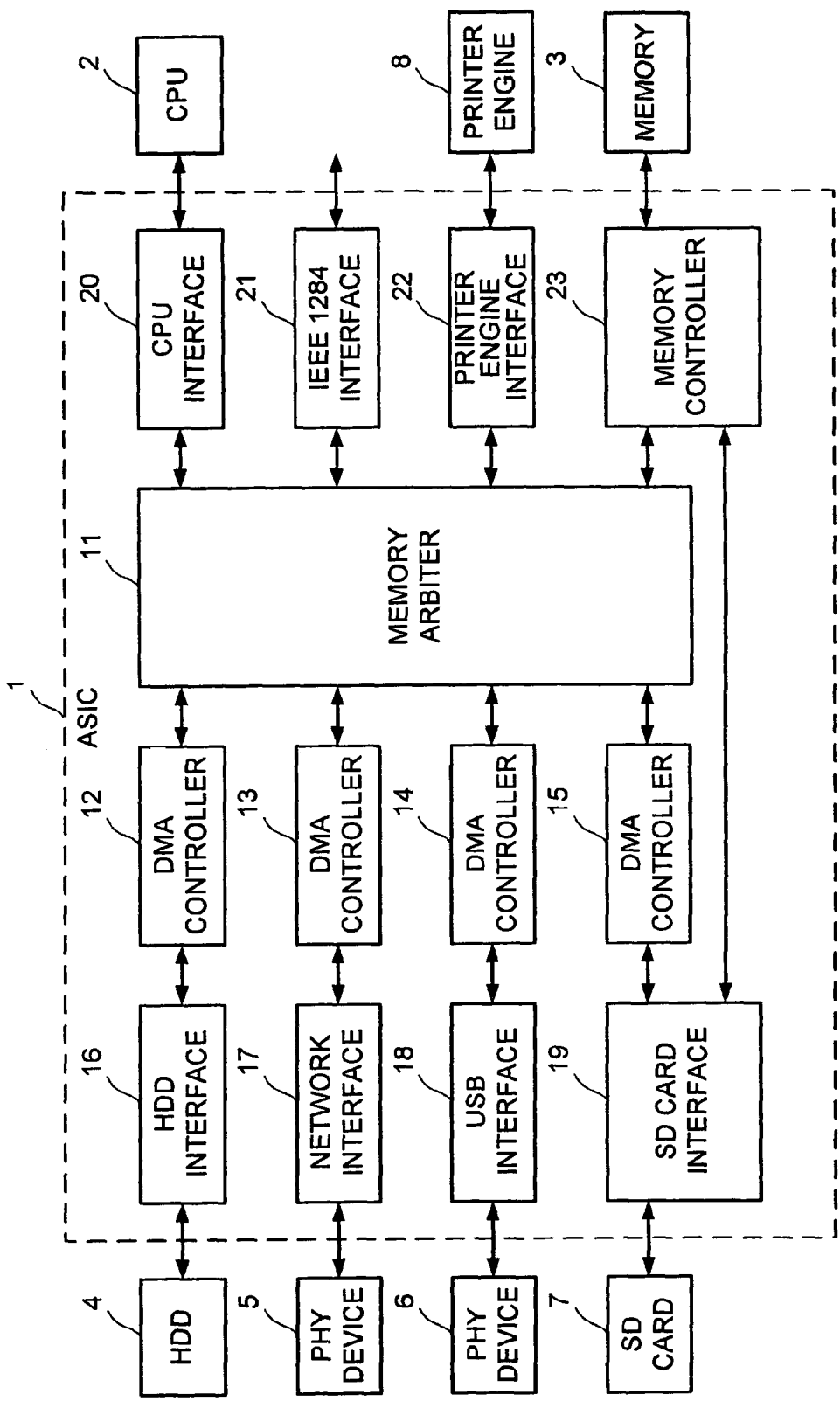
FIG. 1 is a block diagram of an image forming apparatus that is equipped with an ASIC embedded with an SD card interface according to the present invention.

FIG. 1 is a block diagram of hardware of an image forming apparatus that is equipped with an ASIC having an SD card interface embedded in it. In this block diagram, 1 is an ASIC that has a plurality of application functions like an image input and output function, an image processing function, and a data communication function. Each application function can use memory, hard disc etc as a common source. 2 is a CPU that controls the image forming apparatus, 3 is a memory to which a random access can be made, 4 is a hard disc drive (hereinafter "HDD") that stores an image data and a program, 5 is a physical layer device (hereinafter "PHY device") (network device), 6 is a PHY device (universal serial bus (hereinafter "USB") device), 7 is an SD card, and 8 is a printer engine that prints the image data on paper.

The ASIC represented by 1 includes a memory arbiter 11 that connects and arbitrates a device to be connected, a direct memory access (hereinafter "DMA") controller 12 that is connected to the memory arbiter 11 and carries out DMA control of an HDD 4, a DMA controller 13 that is connected to the memory arbiter 11 and carries out DMA control of the PHY device 5, a DMA controller 14 that is connected to the memory arbiter 11 and carries out DMA control of the PHY device 6, a DMA controller 15 that is connected to the memory arbiter 11 and carries out DMA control of the SD card 7, an HDD interface 16 that is connected to the DMA controller 12 and is an interface of the HDD 4, a network interface 17 that is connected to the DMA controller 13 and is an interface of the PHY device (network device) 5, a USB interface 18 that is connected to the DMA controller 14 and is an interface of the PHY device 6, an SD card interface 19 that is connected to the DMA controller 15 and is an interface of the SD card 7, a CPU interface 20, an IEEE 1284 interface 21, a printer engine interface 22 that is an interface of the printer engine, and a memory controller that reads and writes data in memory 3.

In this configuration, the SD card interface 19 is connected to the memory arbiter through the DMA controller 15 and is also connected to a memory controller 23 that is for random access. This configuration enables transfer of data from the SD card 7 to each of the memory 3, the HDD 4, the PHY device (network device) 5, and the PHY device (USB device) 6. Thus, a program stored in the SD card 7 can be transferred to the memory 3, the HDD 4, the PHY device (network device) 5, the PHY device (USB device) 6.

Figure 2:
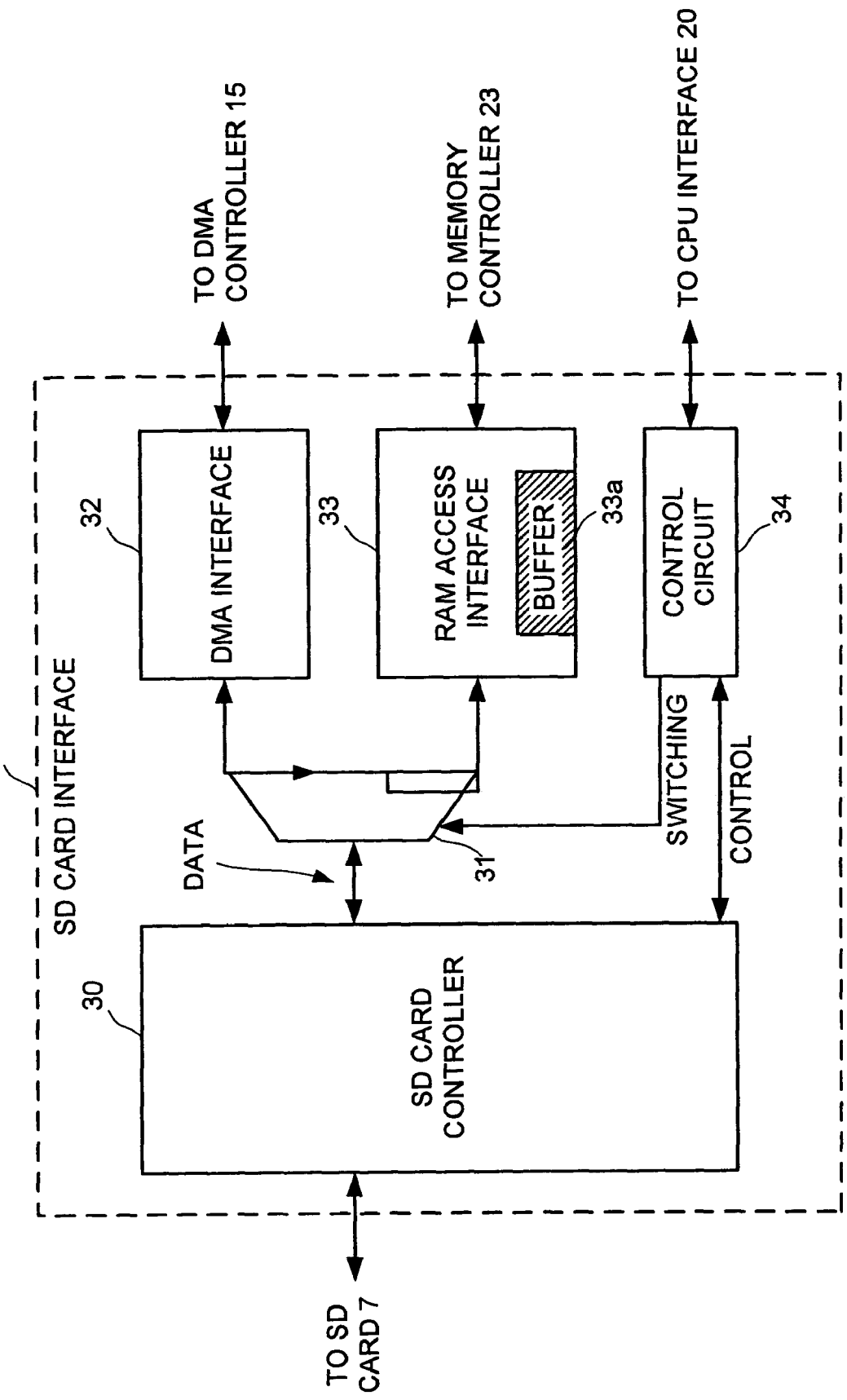
FIG. 2 is a block diagram of an SD card interface shown in FIG. 1.

FIG. 2 is a block diagram of the SD card interface 19 in FIG. 1. The SD card interface 19 includes an SD card controller 30, a multiplexer 31, a DMA interface 32, a RAM access interface 33, and a control circuit 34.

The SD card controller 30 reads and writes data in sector in the SD card 7 according to an SD card standard. The control circuit 34 is a circuit block that assigns a control command from a CPU 2 to the SD card controller 30. The control circuit 34 also controls the multiplexer 31, switches over the connection between the DMA interface 32 and the RAM access interface 33, and switches over the connection of SD card 7 between DMA transfer and random access.

The DMA interface 32 is a circuit block that is connected to the SD card controller 30 through the multiplexer 31. Moreover the DMA interface 32 is also connected to the DMA controller 15 in FIG. 4 and enables DMA transfer by matching interfaces of the both of the SD card controller 30 and the DMA controller 15.

The RAM access interface 33 is a circuit block for pseudo random access by the CPU 2 to the SD card 7. This circuit block is connected to the SD card controller 30 as well as to the memory controller 23 and matches the interfaces of the these two. The RAM access interface 33 initializes the SD card controller 30. Thus, due to the initialization of the SD card controller 30 by the hardware, there is no need of initialization by the CPU 2. The RAM access interface 33 initializes the SD card 7. Thus, due to the initialization of the SD card 7 by the hardware, there is no need of initialization by the CPU 2.

The RAM access interface 33 includes a 512 byte RAM (buffer) 33a that can store data equivalent to one sector of the SD card 7. The RAM access interface 33 sets a sector of a specified address with respect to the read access that specified the first address from the SD card 7 from the CPU 2. The RAM access interface 33 then reads data in the sector that is set from the SD card through the SD card controller 30, stores it in the RAM 33*a*, and transfers data corresponding to the specified address to the CPU 2. If the read access from the CPU 2 is to read data in a range of the same sector stored in the RAM 33*a*, the RAM access interface 33 reads out the data from the RAM 33*a* instead of reading out the data from the SD card 7. Thus, the setting of the sector of the SD card 7 by the CPU 2 is not necessary and the access to the SD card 7 can be made just by specifying of the address by the CPU 2 thereby enabling the pseudo random access. So, irrespective of the SD card 7, the CPU 2 can read out data of any address in the SD card. Moreover, since the RAM (buffer) 33*a* is provided in the RAM access interface 33 and the data are read in sectors, it is possible to minimize the access to the SD card 7.

Figure 3:
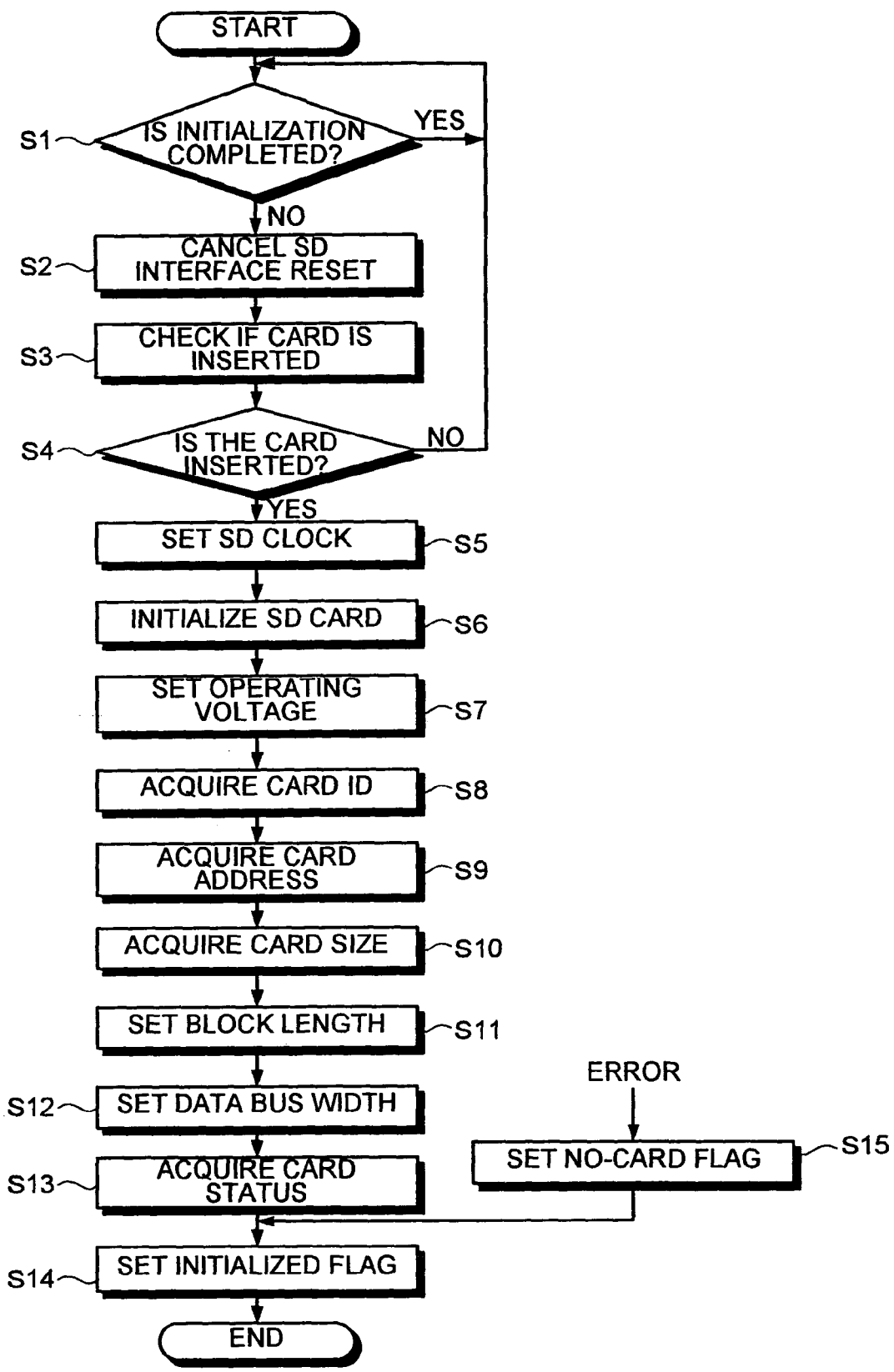
FIG. 3 is a flow chart of an initialization procedure of the SD card by the SD card interface.

FIG. 3 is a flow chart of an initialization procedure of the SD card 7 by the SD card interface 19. The initialization procedure of the SD card 7 by the SD card interface 19 is explained by referring to FIG. 3. The initialization of the SD card 7 by the SD card interface 19 is carried out when the power supply is put ON, when a software is updated, when specific job is carried out by a service engineer like an execution of a self diagnostic program. Thus, by restricting an objective of use of the initialization of the SD card 7 in the hardware by the SD card interface 19, the error is minimized. The RAM access interface 33 initializes the SD card controller 30 before initialization of the SD card 7. Steps shown in FIG. 3 are executed by sequence process of the SD card interface 19.

In FIG. 3, to start with, the RAM access interface 33 judges whether the SD card 7 is initialized or not (step S1). If the SD card 7 is not initialized, then the RAM access interface 33 cancels a reset of an SD card interface 19 (step S2). After this, the RAM access interface 33 checks if the SD card 7 is inserted (step S3) and judges whether the SD card 7 is installed or not (step S4). If the SD card 7 is not installed, the system control returns to step S1, whereas if the SD card 7 is installed, the RAM access interface 33 sets an SD clock (step S5).

Further, the RAM access interface 33 initializes the SD card 7 (step S6) and sets an operating voltage (step S7). Then, the RAM access interface 33 acquires a card ID, a card address, and a card size of the SD card 7 (from step S8 to step S10).

The RAM access interface 33 sets a block length of the SD card 7 (step S11) and then sets a data bus width (step S12). After this, the RAM access interface 33 acquires a card status of the SD card 9 (step S13). Further, based on the information acquired from the SD card 7, the RAM access interface 33 computes an offset value of data read out position and stores this value. After computing and storing of this information, the RAM access interface 33 sets an initialized flag (step S14).

On the other hand, if there is an error due to no card or an unsuitable card, the RAM access interface 33 sets a no card flag (step S15) and then executes step S14. For a case of no card inserted, it is advisable that the insertion check of the card is continued for a fixed time.

Figure 4:
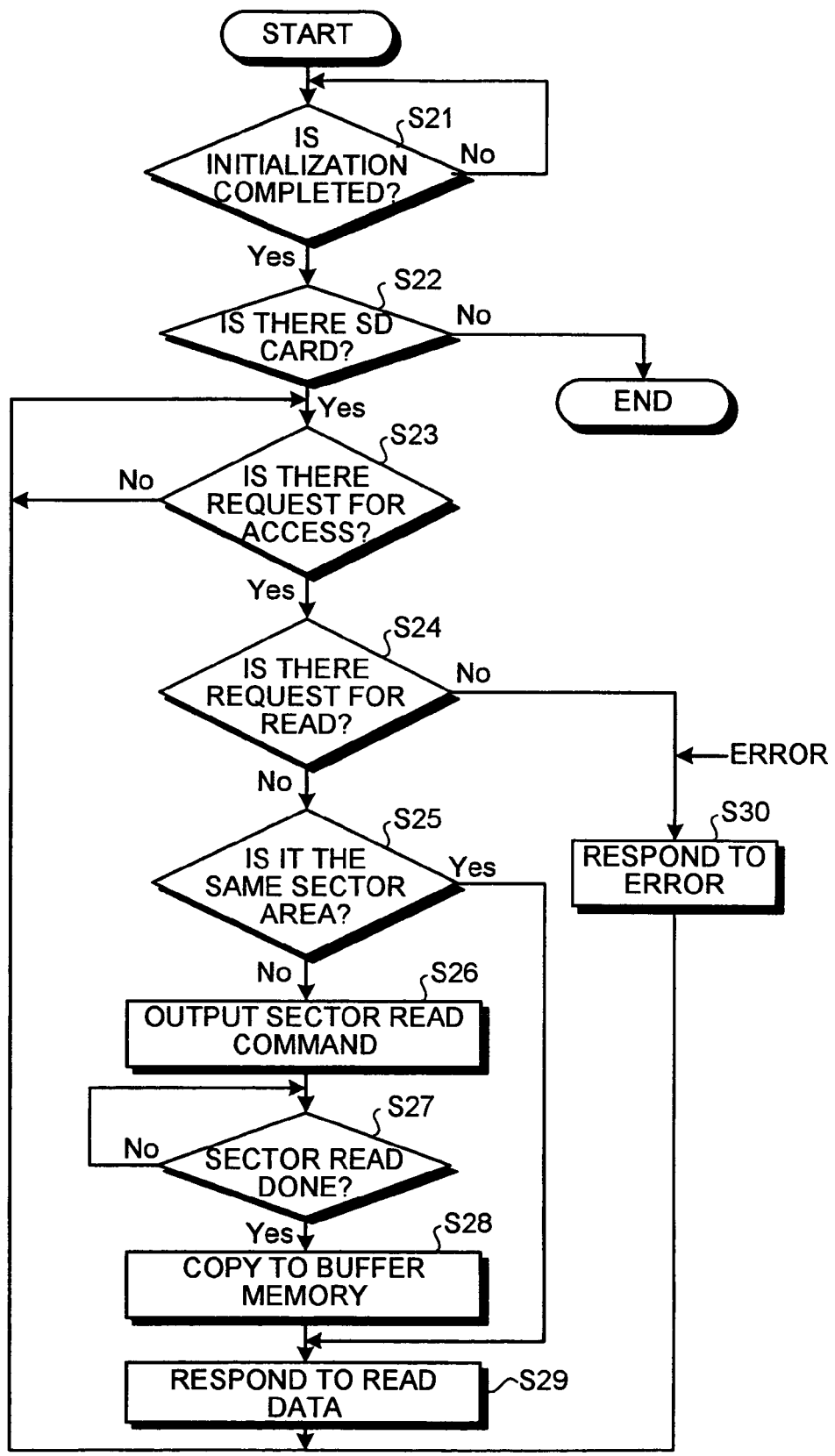
FIG. 4 is a flow chart of an example of a read access of the SD card.

FIG. 4 is a flow chart of an example of a read access flow of the SD card. The read access to the SD card 7 is explained by referring to FIG. 4. The read access to the SD card 7 does not start until the initialization of the SD card 7 in FIG. 3 is completed. Steps shown in FIG. 4 are executed by sequence process of the SD card interface 19.

In FIG. 4, to start with, the RAM access interface 33 judges whether the SD card 7 is initialized or not (step S21). If the SD card 7 is initialized, the RAM access interface 33 judges if the SD card 7 is inserted or not (step S22). If the RAM access interface 33 cannot recognize the SD card, it ends the process. On the other hand, if the RAM access interface 33 recognizes the SD card, it judges whether there is a request from the CPU 2 for an access or not (step S23). If there is a request from the CPU, the RAM access interface 33 judges whether it is a request for the read (step S24). If the request is not the request for the read, the RAM access interface 33 responds an error to the CPU (step S30) and executes step S23.

On the other hand, if there is a request for the read in step S24, the RAM access interface 33 judges whether it is a same sector area as that of data of sector stored in RAM 33*a* (step S25). If it is judged to be the same sector area, the RAM access interface 33 executes step S29 and if it is judged not to be the same sector area, the RAM access interface 33 issues a sector read command to the SD card controller 30 (step S26). The SD card controller 30 reads data of the specified sector according to the sector read command. The RAM access interface 33 judges whether the sector read is completed or not (step S27) and if the sector read is completed, the RAM access interface copies data equivalent to one sector in the RAM 33*a* (buffer memory) (step S28). After the RAM access interface 33 responds the read data to the CPU 2 (step S29), the system control returns to step S23.

The read access is explained in FIG. 4. In a case of a write access, it is advisable that the RAM access interface 33 reads from the SD card 7 a sector that includes an address for which there was a request for the write from the CPU 2, stores it in the RAM 33*a*, rewrites the data of the corresponding data, and writes it once again in the corresponding sector of the SD card 7.

Figure 5:
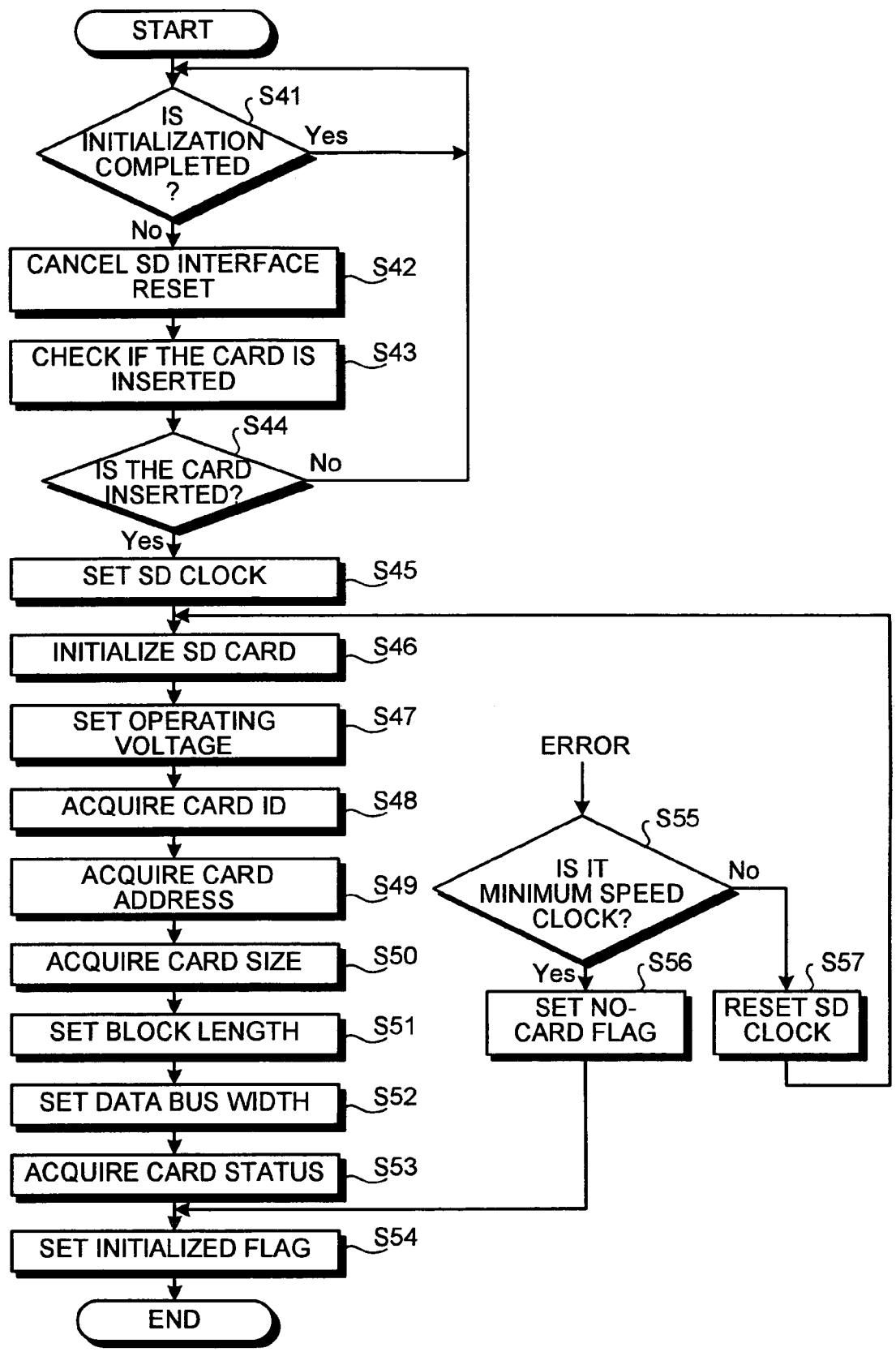
FIG. 5 is a flow chart of self-calibration of a clock during the initialization of the SD card by the SD card interface.

Communication between the SD card 7 and an ASIC 1 is of 1 bit to 4 bits. The communication is affected sometimes by misconversion of data (data error) or disorder of waveform due to an electromagnetic noise. Although the maximum frequency of the data transfer in the SD card 7 is 25 MHz, the effect on communication can be avoided by reducing the frequency in an environment that is apt to communication error. FIG. 5 is a flow chart of a case in which, process including delaying of SD clock in steps, reinitialization, and repeatation of this up to the minimum speed the ASIC 1 can deal with, when a status of an error in communication is reported during initialization of the SD card in FIG. 3, is added. The objective of this process is to minimize the risk involved in carrying out the access to the SD card 7 with the hardware. The self-calibration of the clock during the initialization of the SD card is explained by referring to FIG. 5.

In FIG. 5, to start with, the RAM access interface 33 judges whether the SD card 7 is initialized or not (step S41). If the SD card 7 is not initialized, then the RAM access interface 33 cancels a reset of an SD card interface 19 (step S42). After this, the RAM access interface 33 checks if the SD card 7 is inserted (step S43) and judges whether the SD card 7 is installed or not (step S44). If the SD card 7 is not installed, the system control returns to step S41, whereas if the SD card 7 is installed, the RAM access interface 33 sets the SD clock (step S45).

Further, the RAM access interface 33 initializes the SD card 7 (step S46) and sets the operating voltage (step S47). Then, the RAM access interface 33 acquires the card ID, the card address, and the card size of the SD card 7 (from step S48 to step S50).

The RAM access interface 33 sets the block length of the SD card 7 (step S51) and then sets a data bus width (step S52).

After this, the RAM access interface 33 acquires the card status of the SD card 9 (step S53). Further, based on the information acquired from the SD card 7, the RAM access interface 33 computes an offset value of data read out position and stores this value. After computing and storing of this information, the RAM access interface sets an initialized flag (step S54).

On the other hand, if a status of communication error is reported, the RAM access interface 33 judges whether the SD clock is having the minimum speed or not (step S55). If the SD clock is not judged to be having the minimum speed, the RAM access interface 33 resets the SD clock to be one step slower (step S57) and executes step S46, thereby reinitializing. Whereas, if the SD clock is having the minimum speed, the RAM access interface 33 sets the no card flag (step S56) and step S54 is executed.

Thus according to the first embodiment explained above, the RAM access interface 33 initializes the SD card controller 33 and the SD card 7 as well as acquires the status of the SD card 7. Therefore, there is no need to initialize the SD card controller 30 and the SD card 7 by the CPU and the access to the SD card 7 can be made immediately after the start up of the system.

Moreover, according to the first embodiment, since the RAM access interface is provided to make pseudo random access to the SD card 7 from the CPU 2, it is possible to directly execute the program from the SD card 7 instead of copying the data in the SD card 7 to the memory 3.

Furthermore, according to the first embodiment, since the RAM access interface 33 and the DMA interface 32 can be used (alternately) by switching, the storage application and the RAM application of the card memory can coexist and be selected in the same system.

According to the first embodiment, since the SD card interface 19 reduces the communication speed in steps to the minimum speed and continues the communication if there is an error during communication with the SD card, no calibration is to be done in the CPU or the hardware and the stopping of operation due to the data transfer error is prohibited.

Further, according to the first embodiment, since the program can be downloaded from the SD card, it is possible to execute a system debug program to download additional application and to update the program during start up of the system. Moreover, a program that is formed by a plurality of memory cards conventionally can be formed by one SD card thereby enabling to improve the efficiency of the field support.

Figure 6:
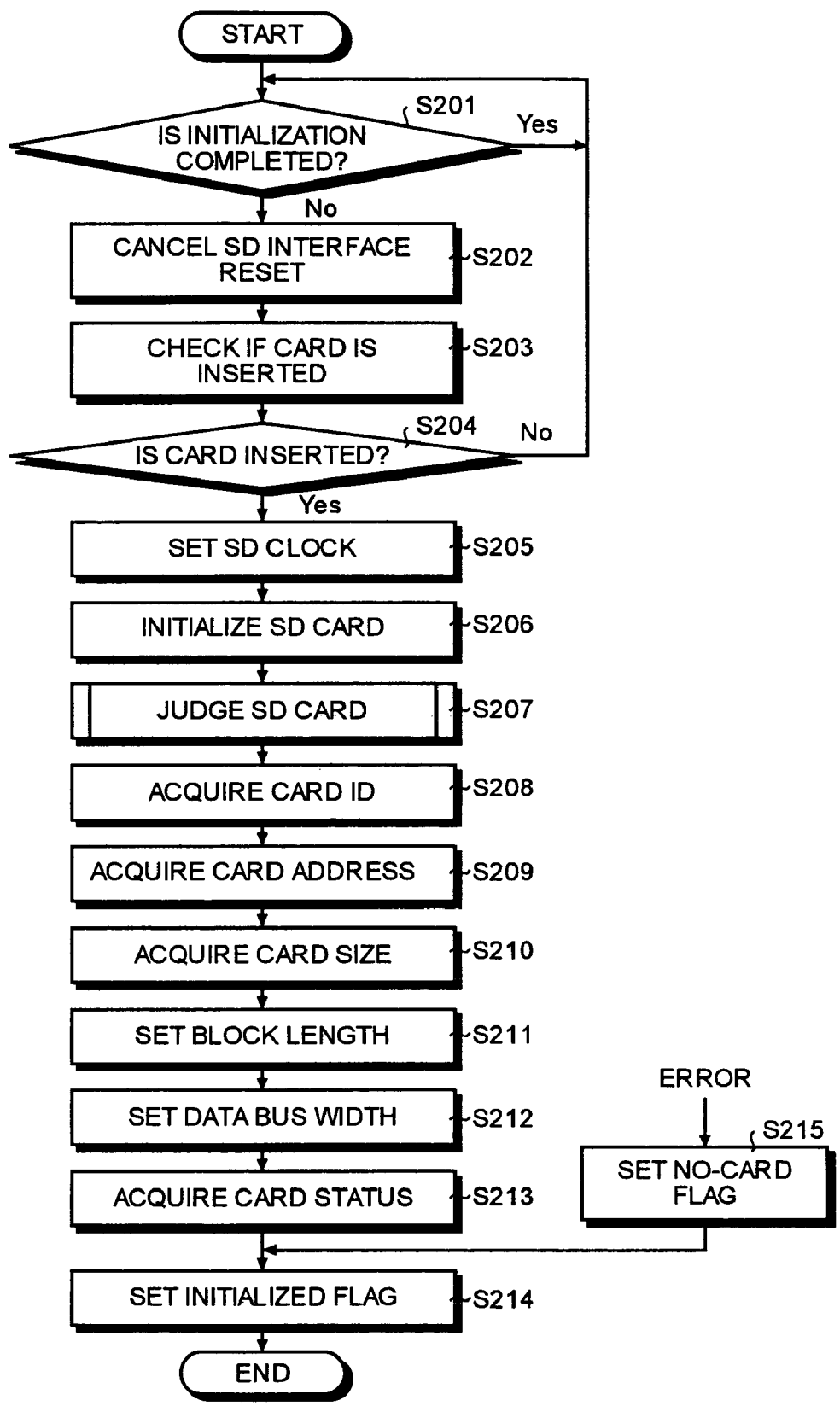
FIG. 6 is a flow chart of the initialization procedure of the SD card by the SD card interface according to a second embodiment of the present invention.
Figure 7:
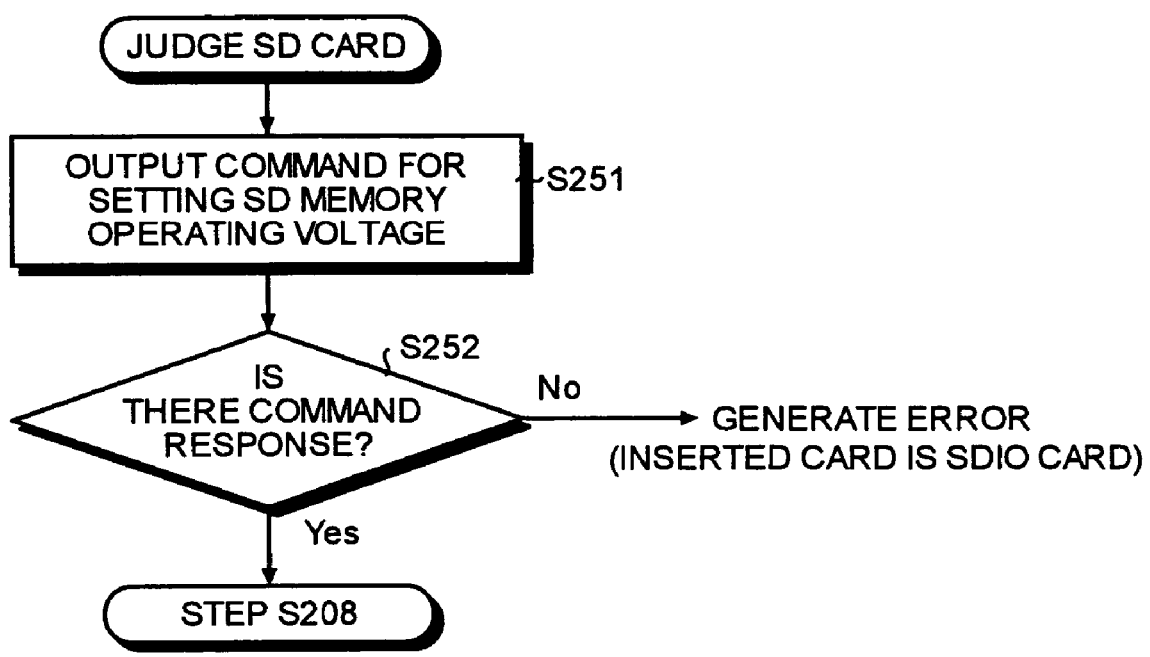
FIG. 7 is a flow chart of judging process of the SD card according to the second embodiment.

An image forming apparatus according to a second embodiment of the present invention is explained by referring to FIG. 6 and FIG. 7. In the second embodiment, the configuration of the image forming apparatus and the configuration of the SD card interface is similar to that in the first embodiment (FIG. 1 and FIG. 2). However, the SD card controller 30 in FIG. 2 is a controller that recognizes only the command protocol of the SD memory card (and cannot recognize the command protocol of the SDIO card).

Thus, if the SDIO card is inserted, there is a fault in the initialization procedure of the card memory that may result in hindering the whole system. Moreover, since the SDIO card has the same interface as that in the SD memory card, inserting the SDIO card by mistake while carrying out maintenance or software update as a field support of the image forming apparatus causes a fault in the system. A configuration that avoids a fault in the system if the SDIO memory is inserted by mistake is explained below.

The initialization of the SD card in the second embodiment is explained by referring to FIG. 2, FIG. 6, and FIG. 7. FIG. 6 is a flow chart of the initialization procedure of the SD card 7 by the SD card interface 19 in FIG. 2 and FIG. 7 is a flow chart of concrete explanation of judging of the SD card in FIG. 6.

The initialization of the SD card 7 by the SD card interface 19 is carried out when the power supply is put ON, when a software is updated, when a specific job is carried out by a service engineer like an execution of a self diagnostic program. Thus, by restricting an objective of use of the initialization of the SD card 7 in the hardware by the SC card interface, the error is minimized. The RAM access interface 33 initializes the SD card controller 30 before initialization of the SD card 7. Steps shown in FIG. 6 are executed by sequence process of the SD card interface 19.

It is not shown in the figure, but in steps shown in FIG. 6 (from step S206 to S213) the configuration is such that a command is issued to the SD card 7 and a different command is issued at each step. Moreover, in the configuration, when the command is issued, a command response indicating that the command is received by the SD card 7, returns from the SD card 7 to the SD card controller 30.

In FIG. 6, to start with, the RAM access interface 33 judges whether the SD card 7 is initialized or not (step S201). If the SD card 7 is not initialized, then the RAM access interface 33 resets the SD card interface 19 (step S202). After this, the RAM access interface 33 checks if the SD card 7 is inserted (step S203) and judges whether the SD card 7 is installed or not (step S204). If the SD card 7 is not installed, the system control returns to step S201, whereas if the SD card 7 is installed, the RAM access interface 33 sets the SD clock (step S205).

Further, the RAM access interface 33 initializes the SD card 7 (step S206) and judges the SD card (step S207). Concretely, as in FIG. 7, the RAM access interface 33 issues an operating voltage command for the SD memory to the SD card 7 (step S251). In this case, if the inserted SD card 7 is an SD memory card, the command response returns to the RAM access interface. On the other hand, if the inserted SD card 7 is an SDIO card, there is no command response. The RAM access interface 33 judges whether or not there is a command response (step S252). It there is a command response (Yes at step S252), step S208 is executed, whereas if there is no command response, the RAM access interface judges the inserted card not to be the SD card (SDIO card) and there is an error.

In FIG. 6, the RAM access interface 33 acquires a card ID, a card address, and a card size (from step S208 to step S210). The RAM access interface 33 sets a block length of the SD card 7 (step S211) and then sets a data bus width (step S212). After this, the RAM access interface 33 acquires a card status of the SD card 7 (step S213). Further, based on the information acquired from the SD card 7, the RAM access interface 33 computes an offset value of data read out position and stores this value. After computing and storing of this information, the RAM access interface 33 sets an initialized flag (step S214).

On the other hand, if there is an error due to no card or an unsuitable card, the RAM access interface 33 sets a no card flag (step S215) and then executes step S214. For a case of no card inserted, it is advisable that the insertion check of the card is continued for a fixed time.

Thus, according to the second embodiment, in the initialization of the SD card, if the SD card controller 30 can not recognize any command except the command of the SD memory card, the RAM access interface 33 monitors the response of the voltage setting command for the SD memory and since the SD card judges whether it is an SD memory card or an SDIO card. Therefore, the SD memory card and the SDIO card can be distinguished automatically.

If it is judged to be an SDIO memory card, the RAM access interface sets the no card flag and stops the operation of the SD card interface 19 thereby enabling to avoid fault in the system when the SDIO memory card is inserted.

A read access to the SD card in the second embodiment is similar to that in the first embodiment hence the explanation is omitted here.

Figure 8:
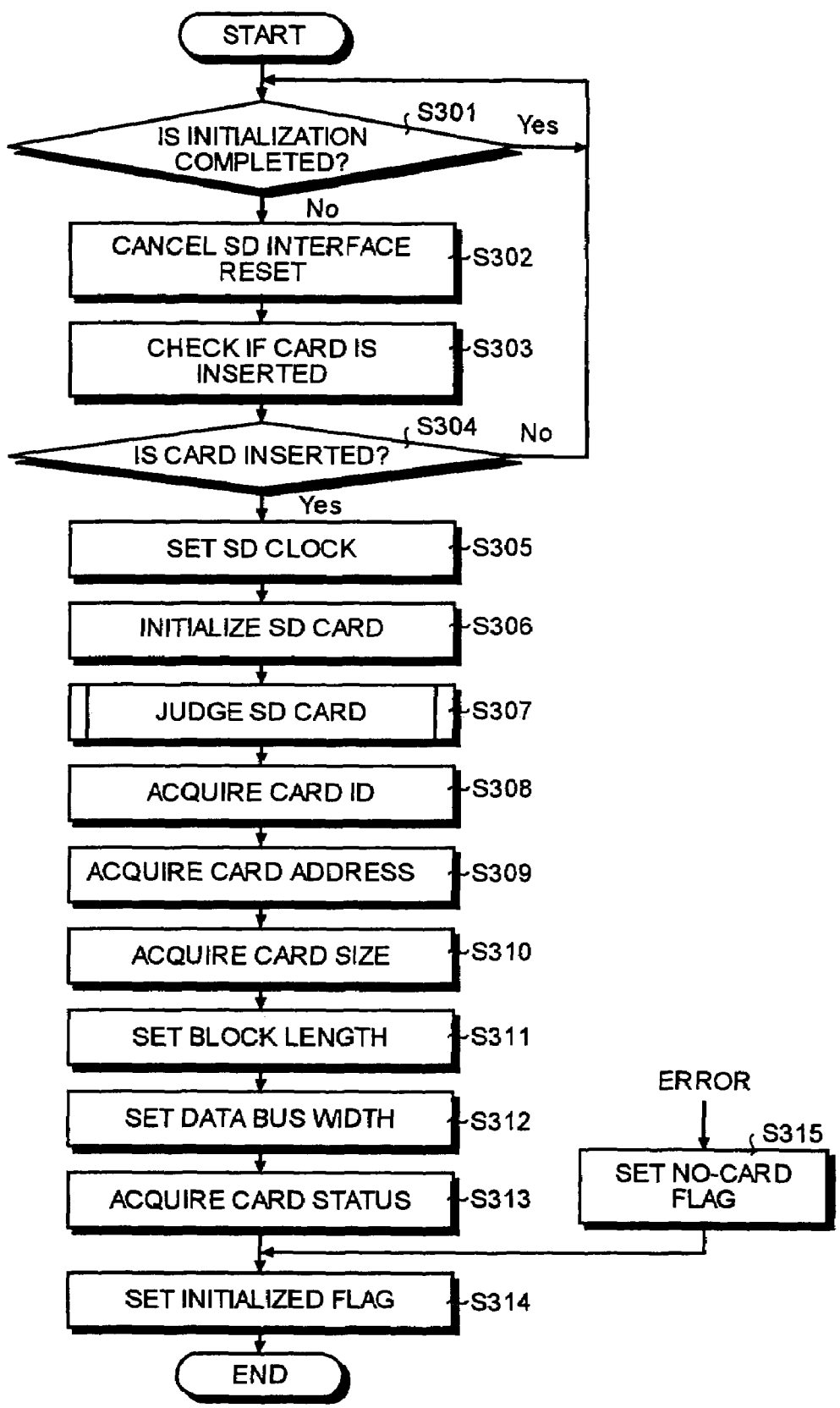
FIG. 8 is a flow chart of the initialization procedure of the SD card by the SD card interface according to a third embodiment of the present invention.
Figure 9:
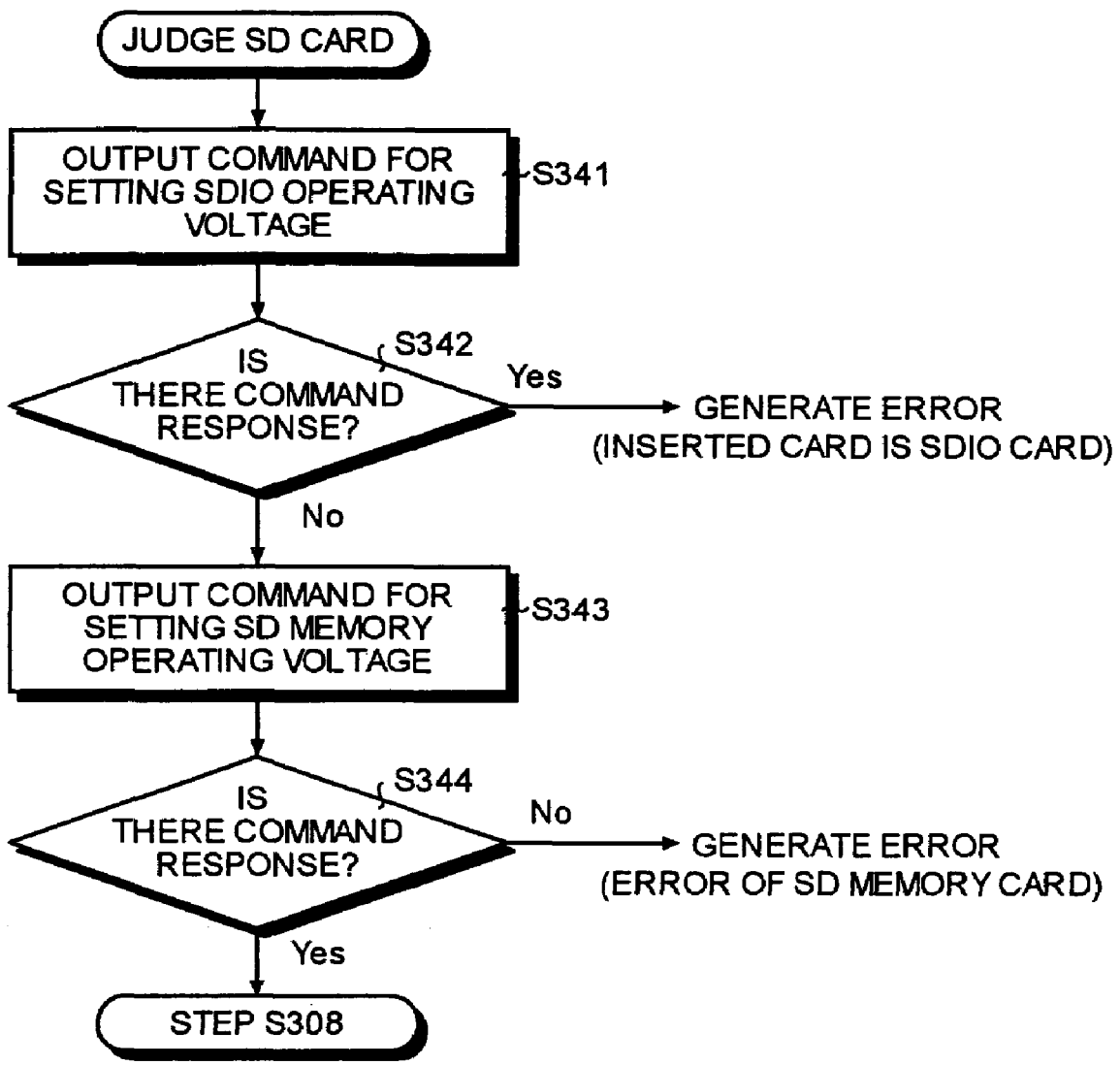
FIG. 9 is a flow chart of judging process of the SD card according to the third embodiment.

An image forming apparatus according to a third embodiment of the present invention is explained by referring to FIG. 8 and FIG. 9. In the third embodiment, the configuration of the image forming apparatus and the configuration of the SD card interface is similar to that in the first embodiment. However, in the third embodiment, the SD card controller 30 in FIG. 2 is a controller that recognizes the command protocol of the SD memory card and the SDIO card.

The initialization of the SD card in the second embodiment is explained by referring to FIG. 2, FIG. 8, and FIG. 9. FIG. 8 is a flow chart of the initialization procedure of the SD card 7 by the SD card interface 19 in FIG. 2, and FIG. 9 is a flow chart of concrete explanation of judging of the SD card in FIG. 8.

The initialization of the SD card 7 by the SD card interface 19 is carried out when the power supply is put ON, when a software is updated, when a specific job is carried out by a service engineer like an execution of a self diagnostic program. Thus, by restricting an objective of use of the initialization of the SD card 7 in the hardware by the SC card interface, the error is minimized. The RAM access interface initializes the SD card controller 30 before initialization of the SD card 7. Steps shown in FIG. 4 are executed by sequence process of the SD card interface 19. It is not shown in the figure, but in steps shown in FIG. 8 (from step S306 to step S313) the configuration is such that a command is issued to the SD card and a different command is issued at each step. Moreover, in the configuration, when the command is issued, a command response indicating that the command is received by the SD card 7, returns from the SD card 7 to the SD card controller 30.

In FIG. 8, to start with, the RAM access interface 33 judges whether the SD card 7 is initialized or not (step S301). If the SD card 7 is not initialized, then the RAM access interface 33 resets the SD card interface 19 (step S302). After this, the RAM access interface checks if the SD card 7 is inserted (step S303) and judges whether the SD card 7 is installed or not (step S304). If the SD card 7 is not installed, the system control returns to step S301, whereas if the SD card is installed, the RAM access interface 33 sets the SD clock (step S320).

Further, the RAM access interface 33 initializes the SD card 7 (step S306) and judges the SD card (step S307). The judgment of the SD card is explained by referring to FIG. 9. In FIG. 9, to start with, the RAM access interface 33 issues an operating voltage setting command for SDIO to the SD card 7 (step S341). If the inserted SD card 7 is an SD memory card, the command response returns to the RAM access interface, whereas if the inserted SD card 7 is an SDIO card, there is no command response. The RAM access interface 33 judges whether or not there is a command response (step S342). If there is a command response (Yes at step S342), the inserted card is judged to be an SDIO card and there is an error, whereas if there is no command response (No at step S342), step S343 is executed.

At step S343, the RAM access interface 33 issues an operating voltage setting command. At step S343, since the inserted card is judged to be the SD memory card, in a normal case the command response returns but in a case of any fault in the SD memory card, there is no response. The RAM access interface 33 judges whether or not there is a command response (step S334). If there is a command response (Yes at step S334), step S308 in FIG. 8 is executed and if there is no command response (No at step S334), the RAM access interface 33 judges the SD memory card to be faulty and there is an error.

In FIG. 8, the RAM access interface 33 acquires a card ID, a card address, and a card size of the SD card 7 (from step S308 to step S310). The RAM access interface 33 sets a block length of the SD card 7 (step S311) and then sets a data bus width (step S312). After this, the RAM access interface 33 acquires a card status of the SD card 7 (step S313). Further, based on the information acquired from the SD card 7, the RAM access interface 33 computes an offset value of data read out position and stores this value. After computing and storing of this information, the RAM access interface 33 sets an initialized flag (step S314)

On the other hand, if there is an error due to no card or an unsuitable card, the RAM access interface 33 sets a no card flag (step S315) and then executes step S329. For a case of no card inserted, it is advisable that the insertion check of the card is continued for a fixed time.

Thus, according to the third embodiment, in the initialization of the SD card, if the SD card controller 30 can recognize the command of the SDIO card, the SD card is judged by setting the operating voltage setting command for the SDIO first. Therefore, the SD memory card and the SDIO card can be distinguished automatically.

If it is judged to be an SDIO memory card, the RAM access interface sets the no card flag and stops the operation of the SD card interface 19 thereby enabling to avoid fault in the system when the SDIO memory card is inserted.

Figure 10:
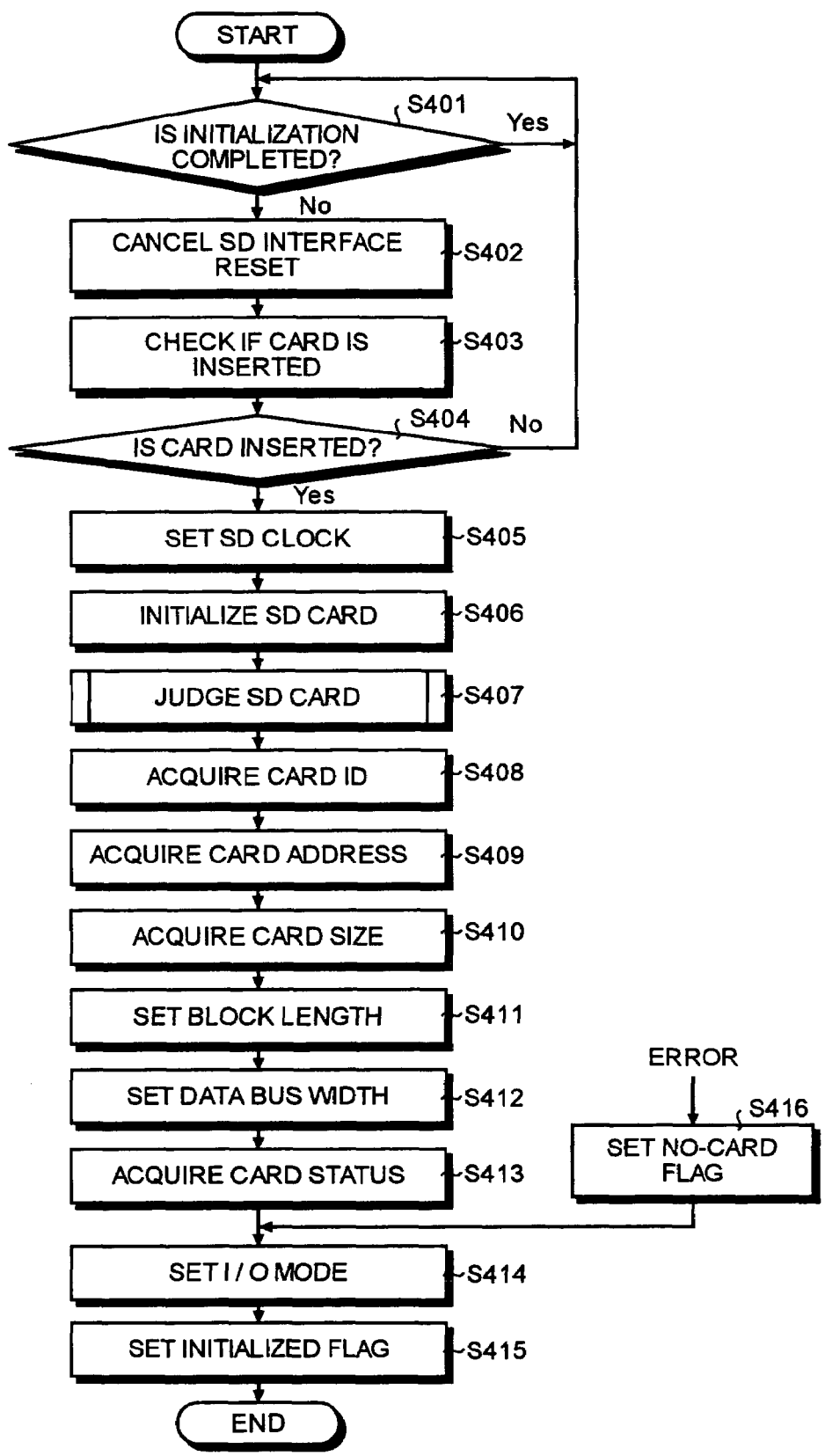
FIG. 10 is a flow chart of initialization procedure of the SD card by the SD card interface according to a fourth embodiment of the present invention.

An image forming apparatus according to a forth embodiment of the present invention is explained by referring to FIG. 10. In the fourth embodiment, the configuration of the image forming apparatus and the configuration of the SD card interface is similar to that in the first embodiment. However, in the fourth embodiment, the SD card controller 30 in FIG. 2 is a controller that recognizes the command protocol of the SD memory card and the SDIO card.

In recent years, scale of software is increasing together with the increased scale of image forming apparatuses. This necessitates bigger capacity of memory that stores software. In the fourth embodiment, a configuration in which an SDIO memory embedded with an I/O function is used and required software is downloaded from an external access server is explained.

The SDIO memory has a large capacity memory area including a flash memory etc. and an I/O area for a buffer that temporarily stores data downloaded from an external server etc. (external unit) using the I/O function. A program is stored in the memory area and this program is used for installing to the image forming apparatus. On the other hand, the I/O area stores temporarily a program downloaded from an external server using the I/O function of the SDIO memory in the image forming apparatus. Data stored in the I/O area is read in the image forming apparatus. For downloading a program from the external server in the image forming apparatus, the CPU 2, through the SD card interface 19, using the I/O function of the SDIO memory connects with the external server and downloads the program.

Figure 11:
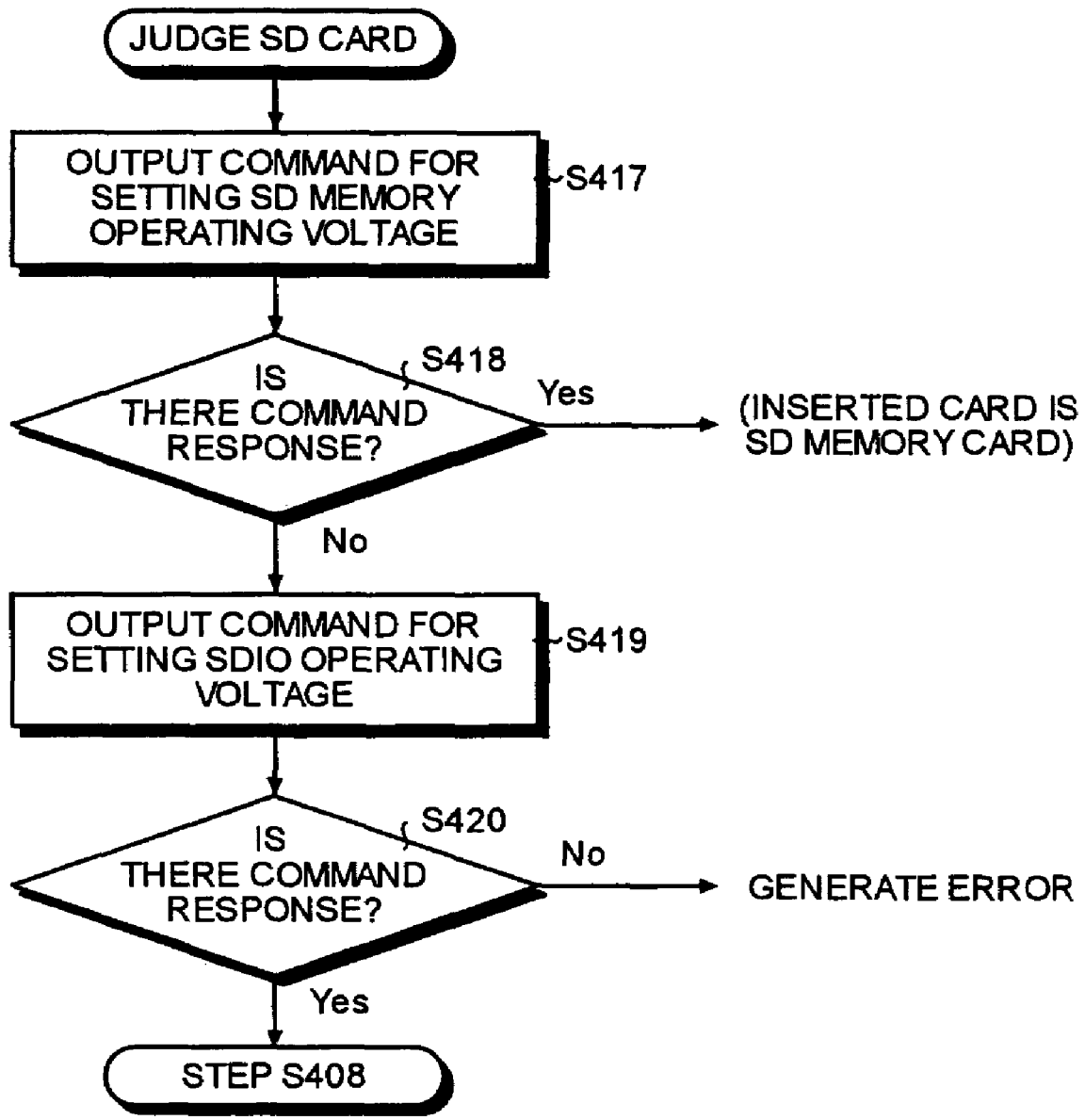
FIG. 11 is a flow chart of judging process of the SD card according to the fourth embodiment.

The initialization of the SD card in the fourth embodiment is explained by referring to FIG. 2, FIG. 10, and FIG. 11. FIG. 10 is a flow chart of the initialization procedure of the SD card 7 by the SD card interface 19 in FIG. 2, and FIG. 11 is a flow chart of a concrete explanation of judging of the SD card in FIG. 10.

The initialization of the SD card 7 by the SD card interface 19 is carried out when the power supply is put ON, when a software is updated, when a specific job is carried out by a service engineer like an execution of a self diagnostic program. Thus, by restricting an objective of use of the initialization of the SD card 7 in the hardware by the SC card interface, the error is minimized. The RAM access interface initializes the SD card controller 30 before initialization of the SD card 7.

Steps shown in FIG. 10 are executed by sequence process of the SD card interface 19. It is not shown in the figure, but in steps shown in FIG. 10 (from step S406 to step S413) the configuration is such that a command is issued to the SD card and a different command is issued at each step. Moreover, in the configuration, when the command is issued, a command response indicating that the command is received by the SD card 7, returns from the SD card 7 to the SD card controller 30.

In FIG. 10, to start with, the RAM access interface 33 judges whether the SD card 7 is initialized or not (step S401). If the SD card is not initialized, then the RAM access interface 33 resets the SD card interface 19 (step S402). After this, the RAM access interface checks if the SD card is inserted (step S403) and judges whether the SD card 7 is installed or not (step S404). If the SD card 7 is not installed, the system control returns to step S401, whereas if the SD card is installed, the RAM access interface 33 sets the SD clock (step S405). Further, the RAM access interface 33 initializes the SD card 7 (step S406) and judges the SD card (step S407).

The judgment of SD card is explained by referring to FIG. 11. In FIG. 9, to start with, the RAM access interface issues an operating voltage setting command for the SD memory to the SD card 7 (step S417). If the inserted SD card 7 is an SD memory card, the command response returns to the RAM access interface 33, whereas if the inserted SD card is an SDIO card, there is no command response.

The RAM access interface judges whether or not there is a command response (step S418). If there is a command response (Yes at step S418), the inserted SD card 7 is judged to be the SD memory card and similar steps from step S8 to step S15 in FIG. 3 are executed.

However, if there is no command response (No at step S418), the RAM access interface 33 issues an SDIO operating voltage setting command (step S419). At step S419, since the inserted card is judged to be the SDIO memory card, in a normal case the command response is returned but in a case of any fault in the SDIO card, there is no response. The RAM access interface 33 judges whether or not there is a command response (step S420). If there is a command response (Yes at step S420), step S408 in FIG. 10 is executed and if there is no command response (No at step S420), the RAM access interface 33 judges the SDIO card to be faulty and there is an error.

The RAM access interface 33 acquires a card ID, a card address, and a card size of the SD card 7 (from step S408 to step S410). The RAM access interface 33 sets a block length of the SD card 7 (step S411) and then sets a data bus width (step S412). After this, the RAM access interface 33 acquires a card status of the SD card 7 (step S413). Further, based on the information acquired from the SD card 7, the RAM access interface 33 computes an offset value of data position and stores this value. After computing and storing of this information, the RAM access interface 33 sets an I/O mode for communicating with external units (step S414) and sets an initialized flag (step S415).

On the other hand, if there is an error due to no card or an unsuitable card, the RAM access interface 33 sets a no card flag (step S416) and then executes step S414. For a case of no card inserted, it is advisable that the insertion check of the card is continued for a fixed time.

Figure 12:
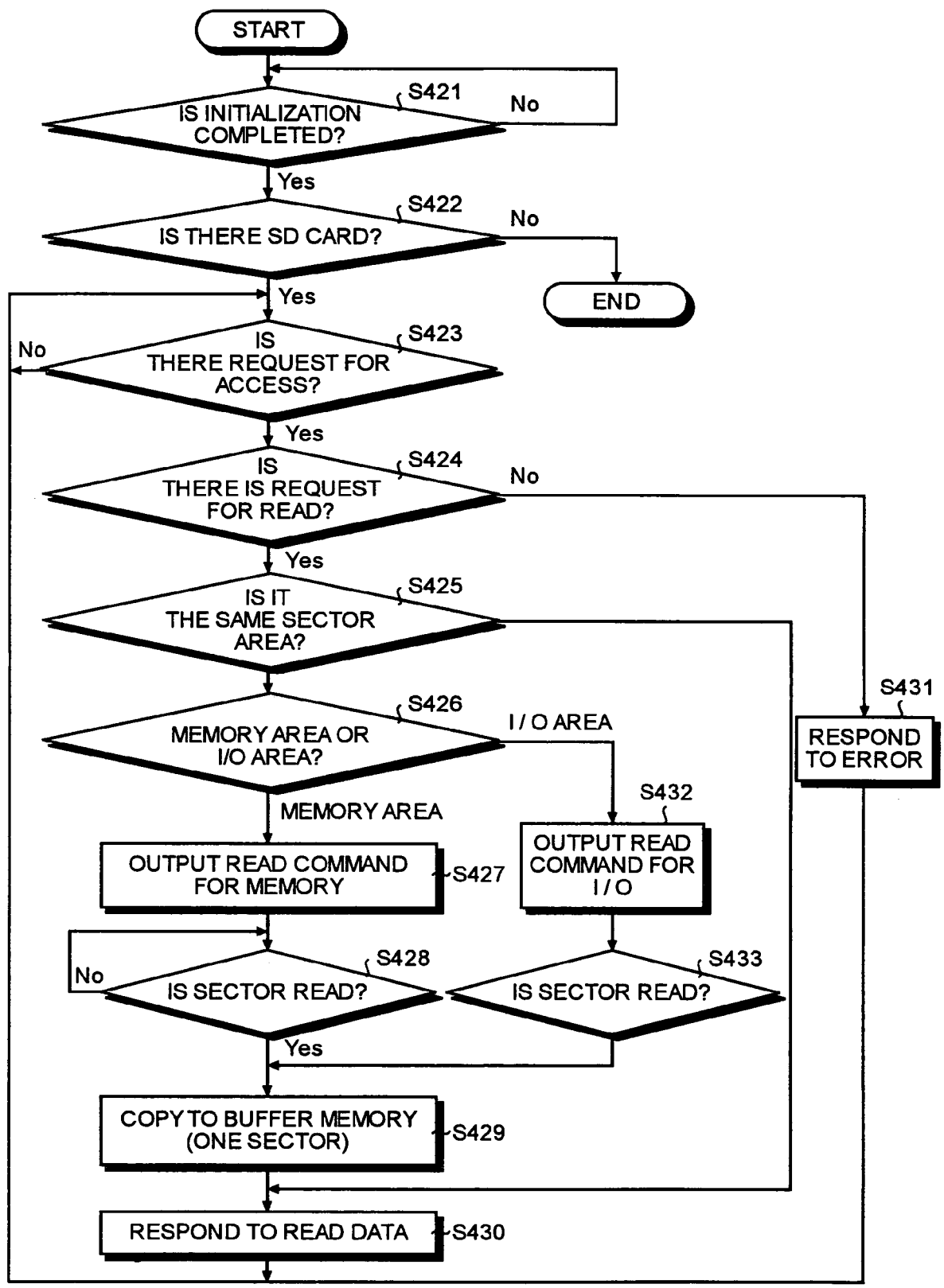
FIG. 12 is a flow chart of an example of read access of the SD card according to the fourth embodiment.

FIG. 12 is a flow chart of an example of read access flow to the SD card. The read access flow to the SDIO card is explained by referring to FIG. 12. A read access to the SD memory card is similar to that in FIG. 5.

The read access to the SD card 7 does not start until the initialization of the SD card 7 in FIG. 12 is completed. Steps shown in FIG. 12 are executed by sequence process of the SD card interface 19.

In FIG. 12, to start with, the RAM access interface 33 judges whether the SDIO card is initialized or not (step S421). If the SDIO card is initialized, the RAM access interface judges if the SDIO card is inserted or not (step S422). If the RAM access interface 33 cannot recognize the SDIO card, it ends the process. On the other hand, if the RAM access interface 33 recognizes the SDIO card, it judges whether there is a request from the CPU 2 for an access or not (step S423). If there is a request from the CPU 2, the RAM access interface 33 judges whether it is a request for a read (step S424). If the request is not the request for the read, the RAM access interface 33 responds an error to the CPU 2 (step S431) and executes step S423.

On the other hand, if there is a request for the read at step S424, the RAM access interface 33 judges whether it is a same sector area as that of data of a sector stored in RAM 33a or not (step S425). If it is judged to be the same sector area, the RAM access interface executes step S430 and if it is judged not to be the same sector area, the RAM access interface 33 judges whether the area wanting to access the SDIO card is either a memory area or an I/O area (step S426). If it is judged to be the memory area, the RAM access interface 33 issues a sector read command for memory to the SD card controller 30 (step S427). The SD card controller 30 reads the data of the specified sector according to the sector read command. The RAM access interface 33 judges whether the sector read is completed or not (step S428) and if the sector read is completed, the RAM access interface 33 copies data equivalent to one sector in the RAM 33a (buffer memory) (step S429).

On the other hand, if it is judged to be the I/O area, the RAM access interface 33 issues the sector read command for the I/O to the SD card controller 30 (step S432). The SD card controller 30 reads data of the specified sector according to the sector read command. The RAM access interface 33 judges whether the sector read is completed or not (step S438) and if the sector read is completed, the RAM access interface copies data equivalent to one sector in the RAM 33a (buffer memory) (step S429).

Further, the RAM access interface 33 returns a response of the read data to the CPU 2 (step S430) and executes step S423.

Thus, according to the fourth embodiment, if the access area is in area more than the capacity of the memory area of the SDID (SDIO card?) card, the data access can be made with the external units by using the I/O function.

Figure 13:
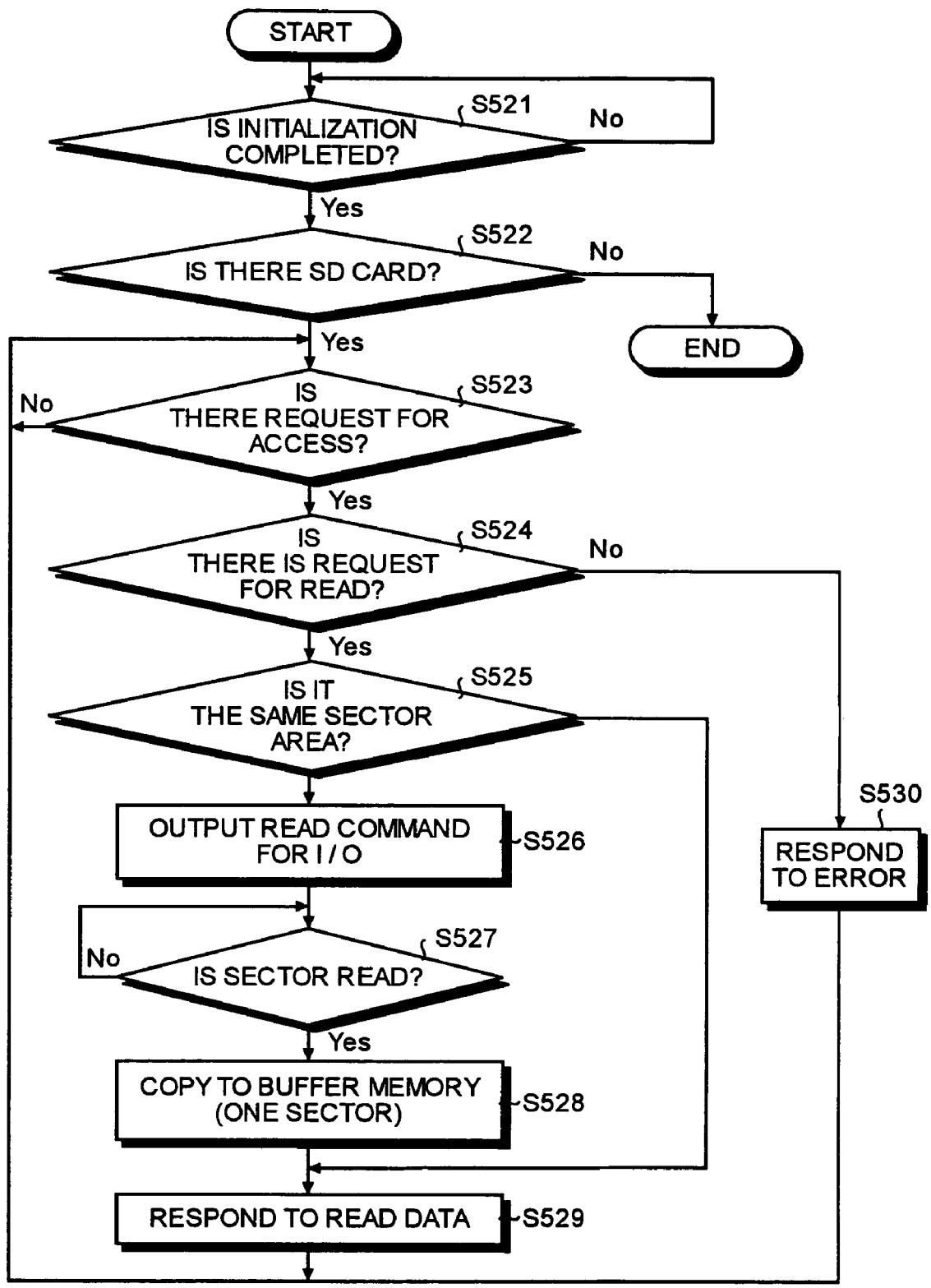
FIG. 13 is a flow chart of an example of read access flow of the SD card according to a fifth embodiment of the present invention.

An image forming apparatus according to a fifth embodiment of the present invention is explained by referring to FIG. 13. In the fifth embodiment, the configuration of the image forming apparatus and the configuration of the SD card interface is similar to that in the first embodiment. However, in the fifth embodiment, the SD card controller 30 in FIG. 2 is a controller that recognizes the command protocol of the SD memory card and the SDIO card. An initialization of the SD card 7 is similar to that in the fourth embodiment (FIG. 10), hence omitted.

FIG. 13 is a flow chart of an example of read access flow to the SDIO card. The read access flow to the SDIO card is explained by referring to FIG. 13. The read access to the SDIO card does not start until the initialization in FIG. 10 is not completed. Steps shown in FIG. 13 are executed by sequence process of the SD card interface 19.

In FIG. 13, to start with, the RAM access interface 33 judges whether the SD card 7 is initialized or not (step S521). If the SD card is initialized, the RAM access interface judges if the SD card 7 is inserted or not (step S522). If the RAM access interface 33 cannot recognize the SD card 7, it ends the process. On the other hand, if the RAM access interface 33 recognizes the SD card 7, it judges whether there is a request from the CPU 2 for an access or not (step S523). If there is a request from the CPU 2, the RAM access interface 33 judges if it is a request for a read (step S524). If the request is not the request for the read, the RAM access interface 33 responds an error to the CPU 2 (step S530) and executes step S523.

On the other hand, if there is a request for the read at step S524, the RAM access interface 33 judges whether it is a same sector area as that of data of a sector stored in RAM 33a or not (step S525). If it is judged to be the same sector area, the RAM access interface executes step S526 and if it is judged not to be the same sector area, the RAM access interface 33 issues a read command for an I/O to the SD card controller (step S526). The SD card controller 30 reads the data of a specified sector according to the sector read command. The RAM access interface 33 judges whether the sector read is completed or not (step S527) and if the sector read is completed, the RAM access interface 33 copies data equivalent to one sector in the RAM 33a (buffer memory) (step S528). Then, the RAM access interface 33 returns a response of the read data to the CPU 2 (step S529) and executes step S523.

Thus, according to the fourth embodiment, the data access can be made irrespective of the capacity of the SDIO memory by making an access to an external unit by using the I/O function of the SDIO memory.

The present invention is not restricted to the embodiments mentioned above and appropriate variations can be made within the scope such that there is no change in the gist of the invention. For example, in the embodiments mentioned above, the example of the SD card was used as a card memory for the purpose of explanation. However, the present invention is not restricted only to the SD card and can be applied to other detachable card memory that requires an access in specific size, like a multimedia card.

Thus, according a first aspect of the present invention, in the interface circuit for the card memory, the access to the card memory can be made immediately after the start up of the system without having a need to initialize the interface by the CPU (software).

According to a second aspect of the present invention, in the interface circuit for the card memory, for executing the program stored in the card memory, it is not copied in RAM and the program can be executed directly from the card memory.

According to a third aspect of the present invention, in the interface circuit for the card memory, number of accesses to the card memory can be decreased.

According to a fourth aspect of the present invention, in the interface circuit for the card memory, the storage application and the RAM application of the card memory can coexist and be selected in the same system.

According to a fifth aspect of the present invention, in the interface circuit for the card memory, the calibration is not carried out in the CPU or the hardware and stopping of the operation due to an error in the data transfer can be prohibited.

According to a sixth aspect of the present invention, in the interface circuit for the card memory, it is possible to judge whether or not the card memory is having the I/O function.

According to a seventh aspect of the present invention, in the interface circuit for the card memory, when the interface circuit is not shown in a position to deal with the card memory having the I/O function, and if a card memory having the I/O function is inserted, a fault in the system can be avoided.

According to an eighth aspect of the present invention, in the interface circuit for the card memory, a software of large capacity can be downloaded from an external unit through the card memory.

According to a ninth aspect of the present invention, the interface circuit for the card memory can process an SD card.

According to a tenth aspect of the present invention, the interface circuit for the card memory can process and SD memory card and an SDIO memory card.

According to an eleventh aspect of the present invention, in the ASIC, the access to the card memory can be made immediately after the start up of the system without having a need to initialize the interface by the CPU (software).

According to a twelfth aspect of the present invention, in the image forming apparatus, a program can be downloaded from the card memory.

The present document incorporates by reference the entire contents of Japanese priority documents, 2002-236586 filed in Japan on Aug. 14, 2002 and 2003-130575 filed in Japan on May 8, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An interface circuit for interfacing between a detachable card memory that requires an access in a specific size and a processor, the interface circuit comprising:
    an initializing and status acquiring unit, separate from the processor, an interface controller and the detachable card memory, that initializes the interface controller that reads data from and writes data to the card memory, initializes the card memory and acquires status of the card memory.

2. The interface circuit according to claim 1, further comprising:
    an access circuit that makes pseudo random access from a central processing unit to the card memory.

3. The interface circuit according to claim 2, wherein the access circuit includes a buffer that stores one sector of data that is read from the card memory as a first data, wherein
    if a read access is to read the first data from the buffer, the first data are sent from the buffer to the central processing unit, and
    if the read access is to read data other than the first data in the buffer, one sector of data are read from the card memory, stored in the buffer, and then sent to the central processing unit.

4. The interface circuit according to claim 1, further comprising:
    a direct memory access circuit that carries out direct memory access transfer for the card memory; and
    a switching circuit that switches over between an access circuit and the direct memory access circuit.

5. The interface circuit according to claim 1, wherein if an error occurs during communication between the interface circuit and the card memory, the interface circuit gradually reduces speed of the communication to carry out the communication.

6. The interface circuit according to claim 1, wherein the card memory initializing unit includes a judging unit that judges whether the card memory is a card memory with an input/output function or a card memory without an input/output function.

7. The interface circuit according to claim 6, wherein if the card memory is judged to be a card memory with the input/output function by the judging unit, the card memory initializing unit disables the interface circuit for the card memory.

8. The interface circuit according to claim 6, wherein if the card memory is judged to be a card memory with the specific input/output function by the judging unit, the access circuit makes an access to data of an external unit using the specific input/output function of the card memory with the specific input/output function or makes an access to data stored in a memory area of the card memory with the specific input/output function.

9. The interface circuit according to claim 6, wherein
the card memory with the specific input/output function is a secure digital input output card memory; and
the card memory without the specific input/output function is a secure digital card memory.

10. The interface circuit according to claim 1, wherein the card memory is a secure digital card memory.

11. An application specific integrated circuit including an image specific input/output function, an image processing function, and a plurality of application functions, with a configuration that each of the application functions uses a common memory, the application specific integrated circuit comprising:
an interface circuit for a detachable card memory, which requires an access in a specific size, including an initializing and status acquiring unit, separate from a processor, an interface controller and the detachable card memory, that initializes the interface controller that reads data from and writes data to the card memory, initializes the card memory, and acquires status of the card memory.

12. The application specific integrated circuit according to claim 11, wherein the application functions includes data communication.

13. An image forming apparatus equipped with an application specific integrated circuit, wherein
the application specific integrated circuit includes an image specific input/output function, an image processing function, and a plurality of application functions, with a configuration that each of the application functions uses a common memory,
the application specific integrated circuit comprises an interface circuit for a detachable card memory, which requires an access in a specific size, including an initializing and status acquiring unit, separate from a processor, an interface controller and the detachable card memory, that initializes the interface controller that reads data from and writes data to the card memory, initializes the card memory, and acquires status of the card memory, and
the image forming apparatus has a configuration to download a computer program that is stored in the card memory.

14. A method of interfacing a detachable card memory that requires an access in a specific size, comprising:
initializing an interface controller that reads data from and writes data to the card memory, wherein the interface controller is separate from a processor, a RAM access interface used to initialize the interface controller and the detachable card memory;
initializing the card memory using the RAM access interface; and
acquiring a status of the card memory.

* * * * *